US008776455B2

(12) United States Patent
Azoulay

(10) Patent No.: US 8,776,455 B2
(45) Date of Patent: Jul. 15, 2014

(54) PHOTOVOLTAIC TILE FOR A ROOF

(76) Inventor: Alexandre Azoulay, Paris (FR)

(*) Notice: Subject to any disclaimer, the term of this patent is extended or adjusted under 35 U.S.C. 154(b) by 108 days.

(21) Appl. No.: 13/379,178

(22) PCT Filed: Jun. 17, 2010

(86) PCT No.: PCT/FR2010/051219
§ 371 (c)(1),
(2), (4) Date: Mar. 6, 2012

(87) PCT Pub. No.: WO2011/004092
PCT Pub. Date: Jan. 13, 2011

(65) Prior Publication Data
US 2012/0151856 A1     Jun. 21, 2012

(30) Foreign Application Priority Data
Jun. 17, 2009   (FR) .................................... 09 54068

(51) Int. Cl.
*E04D 13/18*   (2014.01)
(52) U.S. Cl.
USPC ........................... 52/173.3; 126/622; 136/251
(58) Field of Classification Search
USPC .......... 52/173.3; 126/621, 622, 623; 136/246, 136/251
See application file for complete search history.

(56) References Cited

U.S. PATENT DOCUMENTS

| | | | | |
|---|---|---|---|---|
| 4,104,083 A | * | 8/1978 | Hirano | 136/259 |
| 4,830,038 A | * | 5/1989 | Anderson et al. | 136/251 |
| 4,946,512 A | * | 8/1990 | Fukuroi et al. | 136/248 |
| 5,112,408 A | * | 5/1992 | Melchior | 136/251 |
| 5,338,369 A | * | 8/1994 | Rawlings | 136/246 |
| 5,993,582 A | | 11/1999 | Yoshino et al. | |
| 6,311,436 B1 | | 11/2001 | Mimura et al. | |
| 7,469,508 B2 | * | 12/2008 | Ceria | 52/173.3 |
| 7,774,998 B2 | * | 8/2010 | Aschenbrenner | 52/173.3 |
| 2003/0111103 A1 | | 6/2003 | Bower et al. | |

(Continued)

FOREIGN PATENT DOCUMENTS

| | | |
|---|---|---|
| CN | 1934716 A | 3/2007 |
| CN | 101451389 A | 6/2009 |

(Continued)

OTHER PUBLICATIONS

Definition of Embedded: http://www.thefreedictionary.com/embed.*

(Continued)

*Primary Examiner* — Brian Glessner
*Assistant Examiner* — Adriana Figueroa
(74) *Attorney, Agent, or Firm* — Westerman, Hattori, Daniels & Adrian, LLP

(57) ABSTRACT

A photovoltaic tile for a roof includes a plurality of tiles, at least two adjacent tiles of which at least partially overlap each other, including a body (12) having overlapping edges constituting a top edge (20) and a bottom edge (22), the top edge (20) being formed so as to cover the bottom edge (22) of at least one of the adjacent tiles, a photovoltaic layer (40), and electrical connectors (52) which are connected to the photovoltaic layer (40) through electrical conductors (54). The electrical connectors (52) are provided in assembly elements (57, 58) by nesting, the assembly elements being provided on the overlapping edges (20, 22) to enable the overlapping edges to be mutually positioned during the placement of two of the adjacent tiles (10) and the electrical contact of the electrical connectors (52) with each other. The invention also relates a method for manufacturing such tile.

30 Claims, 14 Drawing Sheets

(56) References Cited

U.S. PATENT DOCUMENTS

| | | | | |
|---|---|---|---|---|
| 2005/0204675 | A1* | 9/2005 | Snyder et al. | 52/555 |
| 2008/0098672 | A1* | 5/2008 | O'Hagin et al. | 52/173.3 |
| 2008/0135094 | A1* | 6/2008 | Corrales | 136/259 |
| 2008/0230110 | A1* | 9/2008 | Freedman | 136/246 |
| 2008/0289679 | A1* | 11/2008 | Ressler | 136/244 |
| 2008/0302030 | A1* | 12/2008 | Stancel et al. | 52/173.3 |
| 2009/0044854 | A1* | 2/2009 | Placer et al. | 136/251 |
| 2009/0077907 | A1* | 3/2009 | Flaherty et al. | 52/173.3 |
| 2009/0205270 | A1* | 8/2009 | Shaw et al. | 52/173.3 |
| 2010/0043319 | A1* | 2/2010 | Bennett | 52/173.3 |

FOREIGN PATENT DOCUMENTS

| | | |
|---|---|---|
| DE | 33 14 637 A1 | 11/1983 |
| DE | 38 22 066 A1 | 1/1990 |
| DE | 296 09 816 U1 | 8/1996 |
| DE | 299 15 648 U1 | 12/1999 |
| DE | 100 20 429 A1 | 11/2001 |
| DE | 200 13 940 U1 | 12/2001 |
| EP | 0 825 654 A2 | 2/1998 |
| EP | 0 884 432 A2 | 12/1998 |
| EP | 2 072 708 A1 | 6/2009 |
| FR | 2 384 913 A1 | 10/1978 |
| NL | 1005287 A1 | 8/1998 |
| WO | 2009/071956 A2 | 6/2009 |

OTHER PUBLICATIONS

International Search Report of PCT/FR2010/051219, mailing date Aug. 25, 2010.

Office Action from Chinese Patent Office dated Oct. 21, 2013.

* cited by examiner

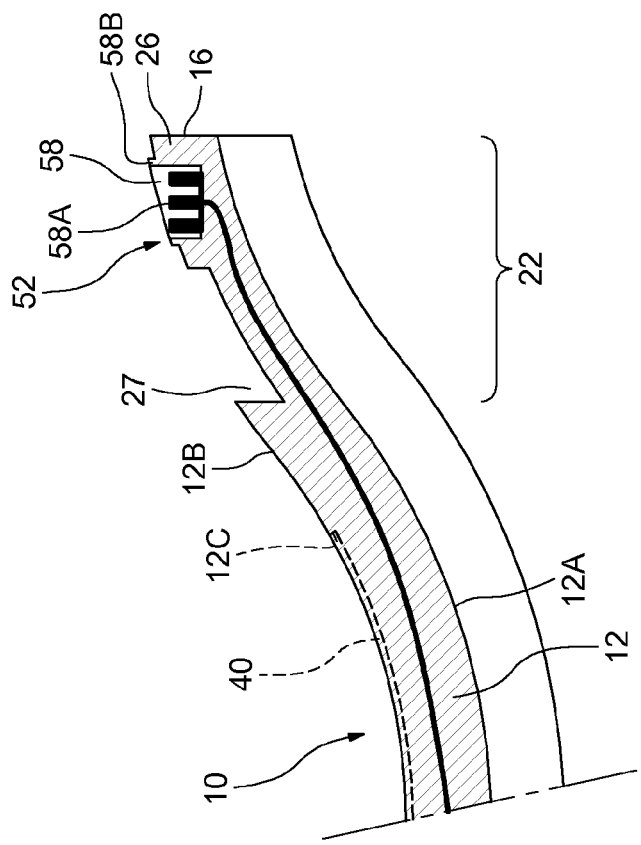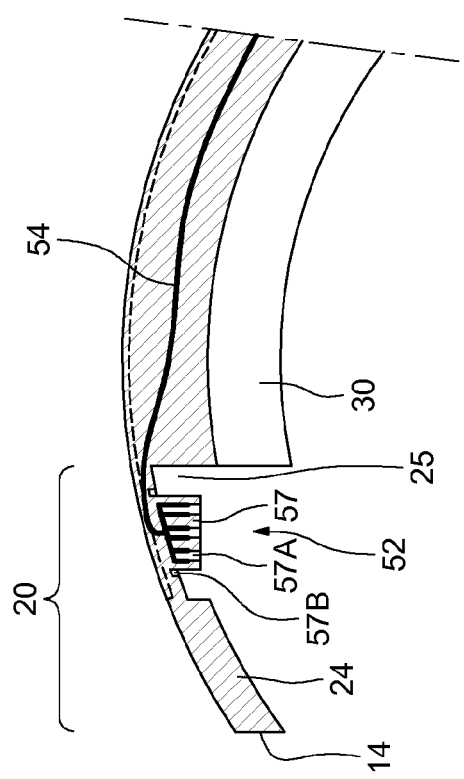
Fig. 2

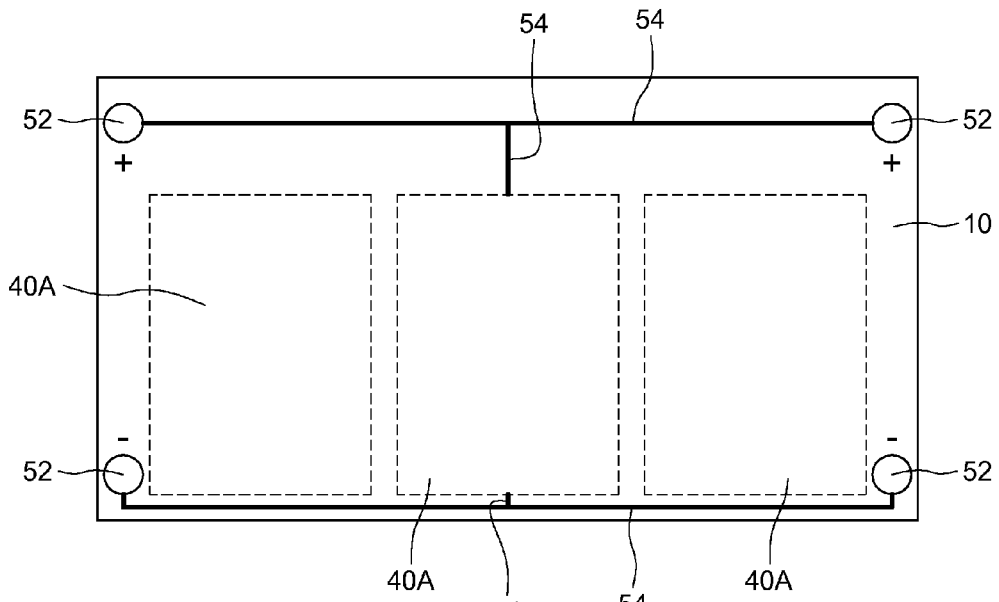
*Fig.11*
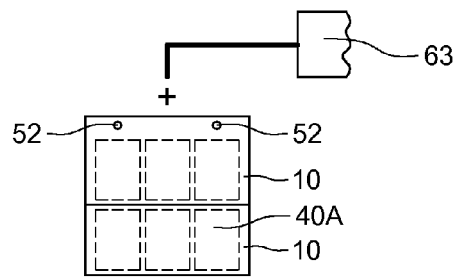
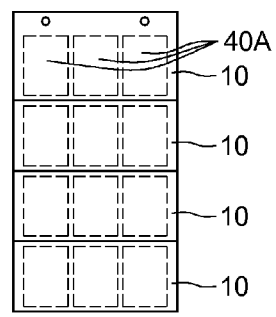
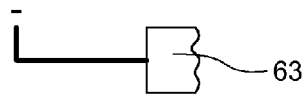
*Fig.12*

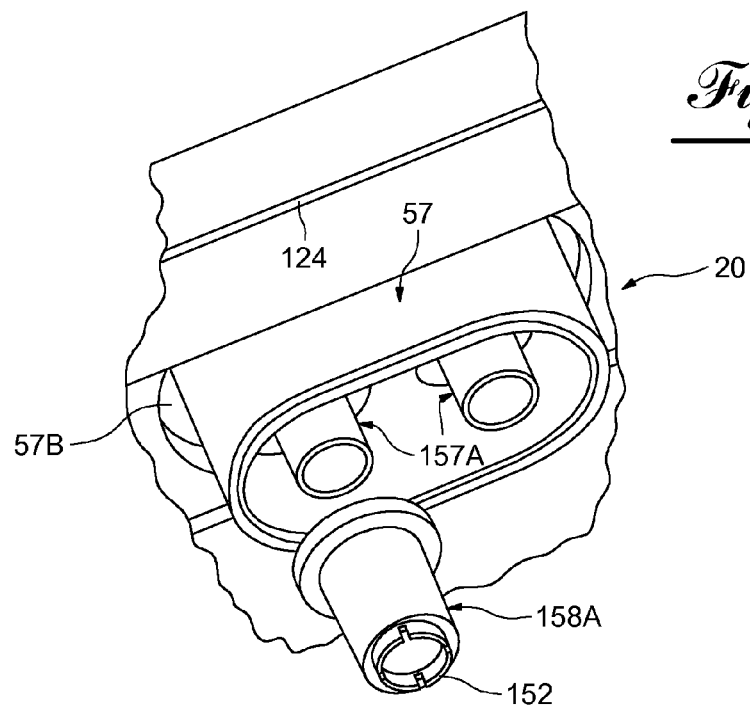
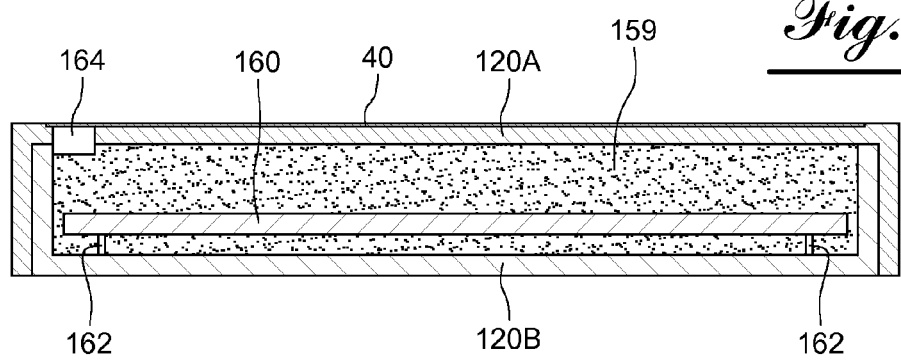
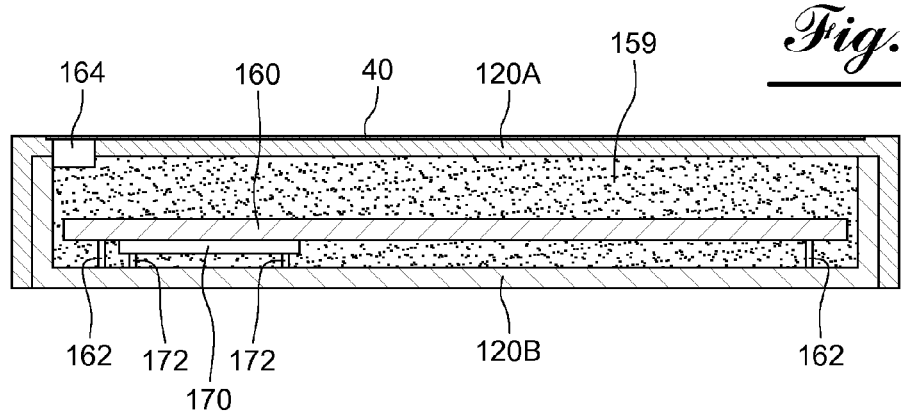

PHOTOVOLTAIC TILE FOR A ROOF

BACKGROUND OF THE INVENTION

The present invention relates to photovoltaic tiles for a roof.

More particularly, the invention relates to a photovoltaic tile for a roof comprising a plurality of said tiles, at least two adjacent tiles of which at least partially overlap each other, including:
- a body having overlapping edges constituting a top edge and a bottom edge, the top edge being formed so as to cover the bottom edge of at least one of the adjacent tiles,
- a photovoltaic layer placed on a free part of the upper surface of the body outside the bottom edge, and
- electrical connectors which are connected to the photovoltaic layer by means of electrical conductors to electrically connect one to another the photovoltaic layers of at least two adjacent tiles of the roof.

This type of tile is known from document NL1005287, in which the photovoltaic tile includes connectors, the connection of which requires precise manipulation of the tiles to prevent their deterioration.

SUMMARY OF THE INVENTION

The present invention in particular aims to resolve the drawbacks of the prior art.

To that end, the invention relates to a photovoltaic tile for a roof comprising a plurality of said tiles, at least two adjacent tiles of which at least partially overlap each other, including a body having overlapping edges constituting a top edge and a bottom edge, the top edge being formed so as to cover the bottom edge of at least one of the adjacent tiles, a photovoltaic layer placed on a free part of the upper surface of the body outside the bottom edge, and electrical connectors which are connected to the photovoltaic layer by means of electrical conductors to electrically connect one to another the photovoltaic layers of at least two adjacent tiles of the roof. In this tile, the electrical connectors are provided in assembly elements by nesting, said assembly elements being provided on the overlapping edges so as to enable said overlapping edges to be mutually positioned during the placement of two of the adjacent tiles so that, through the nesting of the assembly elements, the electrical connectors come into electrical contact with each other.

Owing to these arrangements, the same parts of the tile serve both the electrical connection function and the function for mutual maintenance in position of the adjacent tiles.

In various embodiments of the tile according to the invention, it is possible also to use one or more of the following provisions:
- the conductors are inside the body of the tile in their travel between the photovoltaic layer and their electrical connector;
- the nesting assembly elements comprise, on the one hand, at least one lug that protrudes from one of the top edge or the bottom edge, and on the other hand, at least one housing withdrawn in the other of the bottom edge or the top edge, the electrical connectors being withdrawn in their lug and their housing;
- the lug forms a plug protruding from its overlapping edge and the housing forms a tap formed withdrawn from its overlapping edge;
- the lug and the housing are substantially perpendicular to the median plane of the tile, that plane being provided to be parallel to the plane of a roof surface receiving the tile;
- the photovoltaic layer is in direct contact with the environment;
- the photovoltaic layer is a film adhered to the body of the tile using a flexible adhesive making it possible to absorb the differential expansions between the body and the film;
- the film making up the photovoltaic layer is housed in a cavity withdrawn from the upper surface of the body at the free portion thereof, the depth of the cavity being such that the upper surface of the film is flush with a peripheral part of the free edge of the upper surface of the body;
- the area of the upper surface of the body covered by the photovoltaic film is at least partially hollowed with cooling channels allowing a local passage of air between the body and the photovoltaic film;
- the cooling channels are grooves and the body defines air discharge conduits emerging on the one hand in one of the grooves and on the other hand at the lower surface of the tile;
- the photovoltaic layer is a layer of photovoltaic nanoparticles;
- the body of the tile is made from a polymer-based material, for example ceramic filler, or a wood-based material;
- the body has a base of a material adapted to polymerize upon cooling after molding or during press forming;
- the upper surface of the body of the tile is covered with a protective mineral layer, in particular protecting it from ultraviolet rays;
- the tile includes a thermally insulating layer on the lower surface of the body;
- the thermally insulating layer is covered with a lower finishing layer;
- the body includes an upper half-shell and a lower half-shell defining an inner space;
- the inner space between the upper half-shell and the lower half-shell is filled with a foam;
- the body contains at least one inner thermally insulating layer;
- the body contains an electronic unit for converting direct current into alternating current.

Furthermore, the invention also relates to a method for manufacturing a photovoltaic tile according to the invention, the method including a step for positioning, in a mold, conductors whereof at least one end is provided with an electrical connector, and a step for molding the body of the tile in the mold containing the conductors.

According to one embodiment, this method includes a step for positioning a photovoltaic layer in the mold before the step for molding the body.

According to another embodiment, this method includes a step for positioning a photovoltaic layer on the upper surface of the body after the molding step and after a step of removing the body from the mould.

According to other features, the method includes, after placing at least a first of said tiles on a frame face, a step for bringing a second tile closer so as to position its top edge opposite the bottom edge of the first tile and a step for placing the second tile adjacent to the first tile by bringing it substantially perpendicular to the plane of said frame face with, on the one hand the top edge of the second tile overlapping the bottom edge of the first tile, and on the other hand nesting of the assembly elements substantially perpendicular to said frame face by nesting to mechanically maintain said tiles and connect them electrically.

Furthermore, the invention also relates to a covering assembly for a roof, comprising a plurality of photovoltaic tiles according to the invention placed adjacent to one another, the top edge of one of the tiles overlapping the bottom edge of at least one of the adjacent tiles while having their electrical connectors electrically connected.

BRIEF DESCRIPTION OF THE DRAWINGS

Other aims, features and advantages of the invention will appear during the following description of several embodiments, provided as non-limiting examples, in light of the appended drawings, in which:

FIG. 2 is a partial longitudinal cross-sectional view of the tile according to the invention, along line II-II of FIG. 1, showing its nesting assembly elements and its electrical connector elements;

FIGS. 11 and 12 are views showing the polarities and the cabling of tiles according to that shown in FIGS. 1 to 10;

FIG. 20 is a partial perspective view showing the details of an electrical connector of the tile as shown in FIG. 18, in low angle view;

FIGS. 21 and 22 are cross-sectional views in a longitudinal plane perpendicular to the photovoltaic surface of the tile, showing alternative embodiments of the body of the tile of FIG. 18.

DETAILED DESCRIPTION OF PARTICULAR EMBODIMENTS

Figure 1:
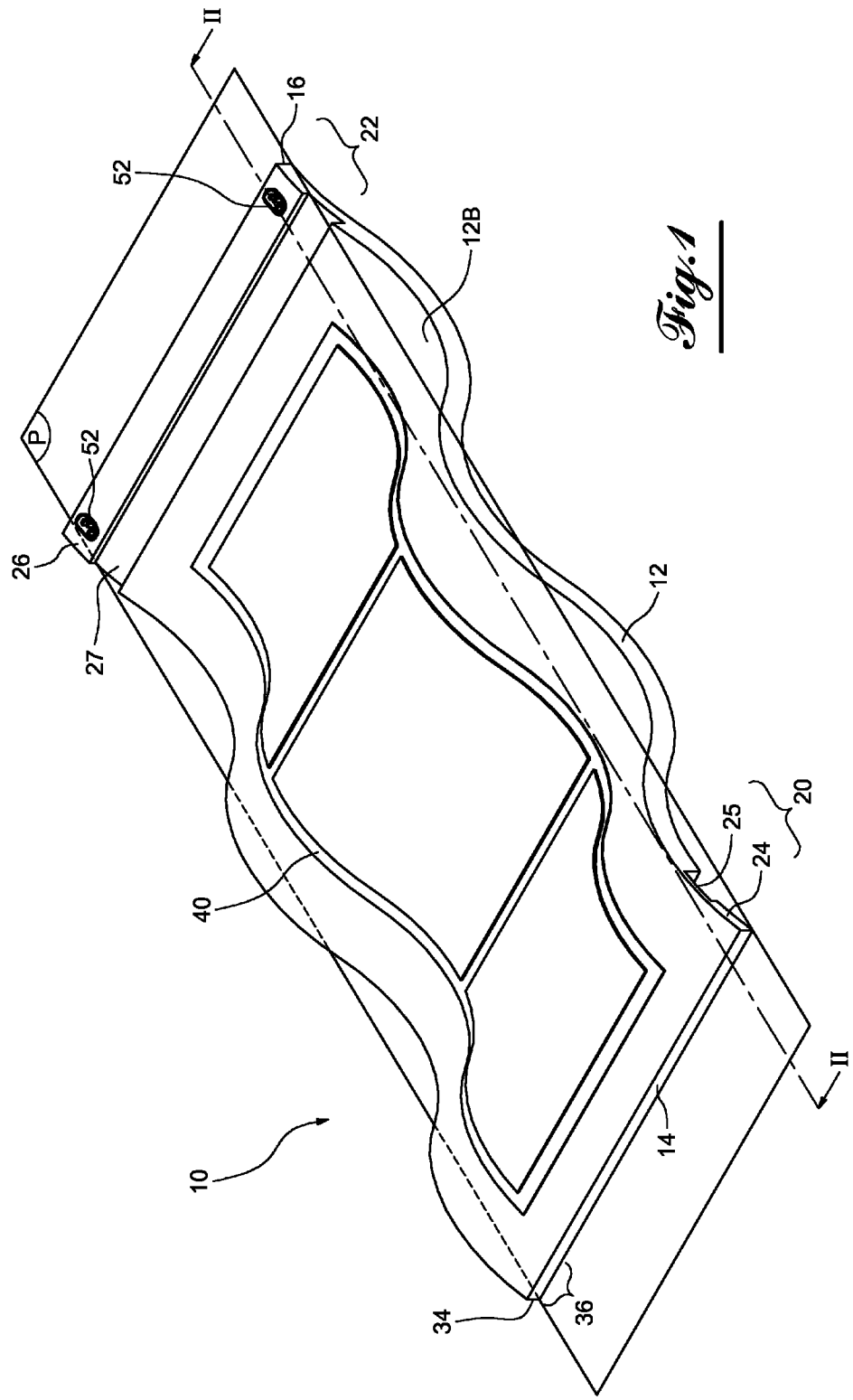
FIG. 1 is a perspective view, of the high-angle view type, of a photovoltaic tile according to the invention.
Figure 3:
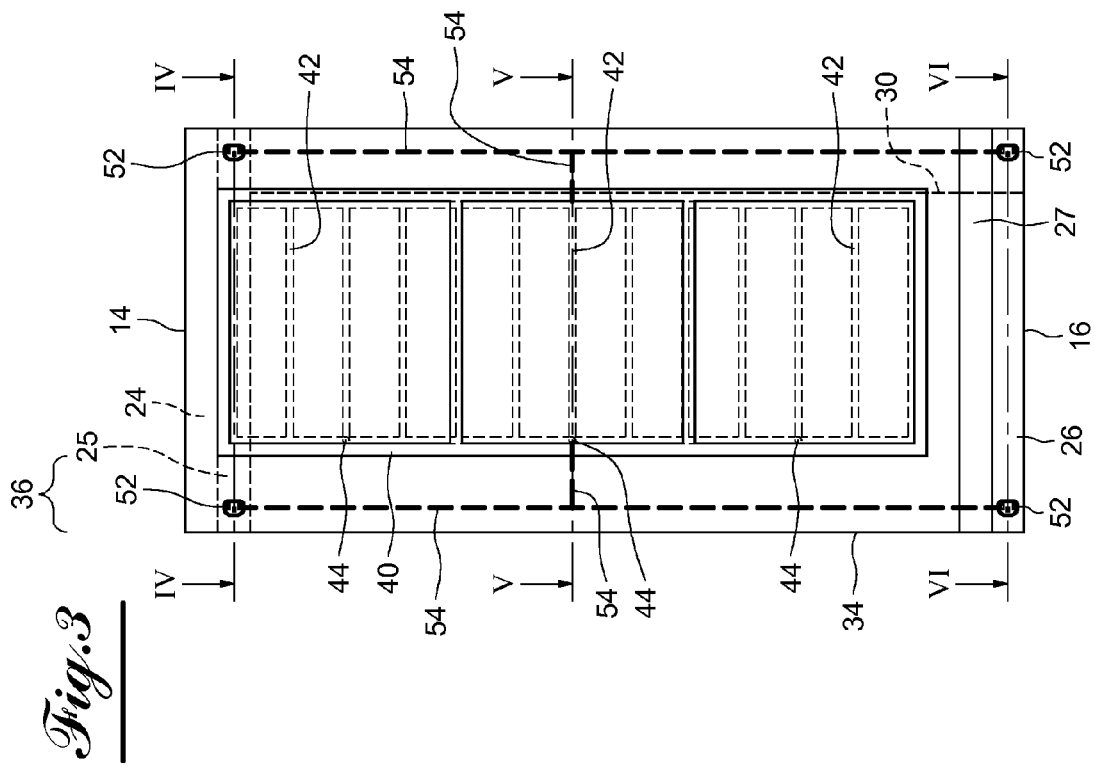
FIG. 3 is a top view of the tile of FIG. 1.
Figure 4:
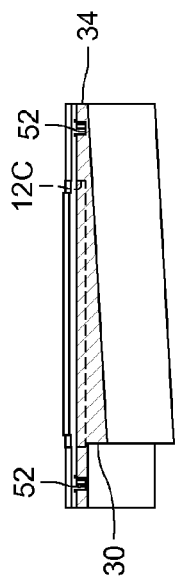
FIGS. 4 to 6 are transverse cross-sections of the tile, respectively along lines IV-IV to VI-VI of FIG. 3.
Figure 5:
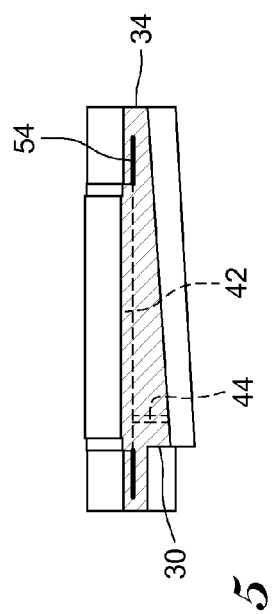
Figure 6:
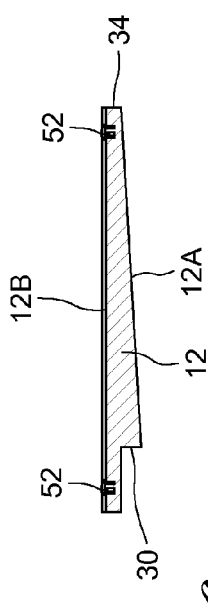

In the different figures, the same references designate identical or similar elements.

In the embodiments of the invention shown in the figures, the photovoltaic tile 10 includes a corrugated body 12, the right 16 and left 14 lateral end surfaces of which intersect, halfway along their height, a median plane P at said body 12. The corrugated tile is sinusoidal, with the result that the median plane P passes through the axis corresponding to the X axis of that sine curve, i.e. the plane P is at mid-height of the tile and parallel to the planes passing through the apices of the tile. In this way, the plane P is parallel to the plane of the face of the frame on which the tile is placed when it is incorporated into a roof.

At lateral end portions, the body 10 includes overlapping edges constituting a top edge 20 and a bottom edge 22, the top edge being formed to overlap the bottom edge of at least one of the adjacent tiles of the roof. The top edge 20 is on the left in FIG. 1, and the bottom edge 22 is on the right in FIG. 1. The thickness of the tile 10 at its edges 20 and 22 is reduced relative to the thickness of the tile in its central portion between the overlapping edges.

The top edge 20 on the one hand has a lateral blocking rib 24 whereof the lateral end is the left lateral end surface 14, and on the other hand, parallel to said surface 14 and toward the inside of the tile from the lateral blocking rib 24, a lateral blocking slot 25 that emerges at the lower surface 12A of the body 12.

The bottom edge 22 has, on the one hand, a lateral blocking rib 26 whereof the lateral end is the right lateral end surface 16 and the shape of which is complementary to that of the lateral blocking slot 25. The bottom edge 22, on the other hand, has, parallel to said surface 16 and toward the inside of the tile from the lateral blocking rib 26, a lateral blocking slot 27, the shape of which is complementary to that of the lateral blocking rib 24 and which emerges at the upper surface 12B of the body 12.

Figure 8:
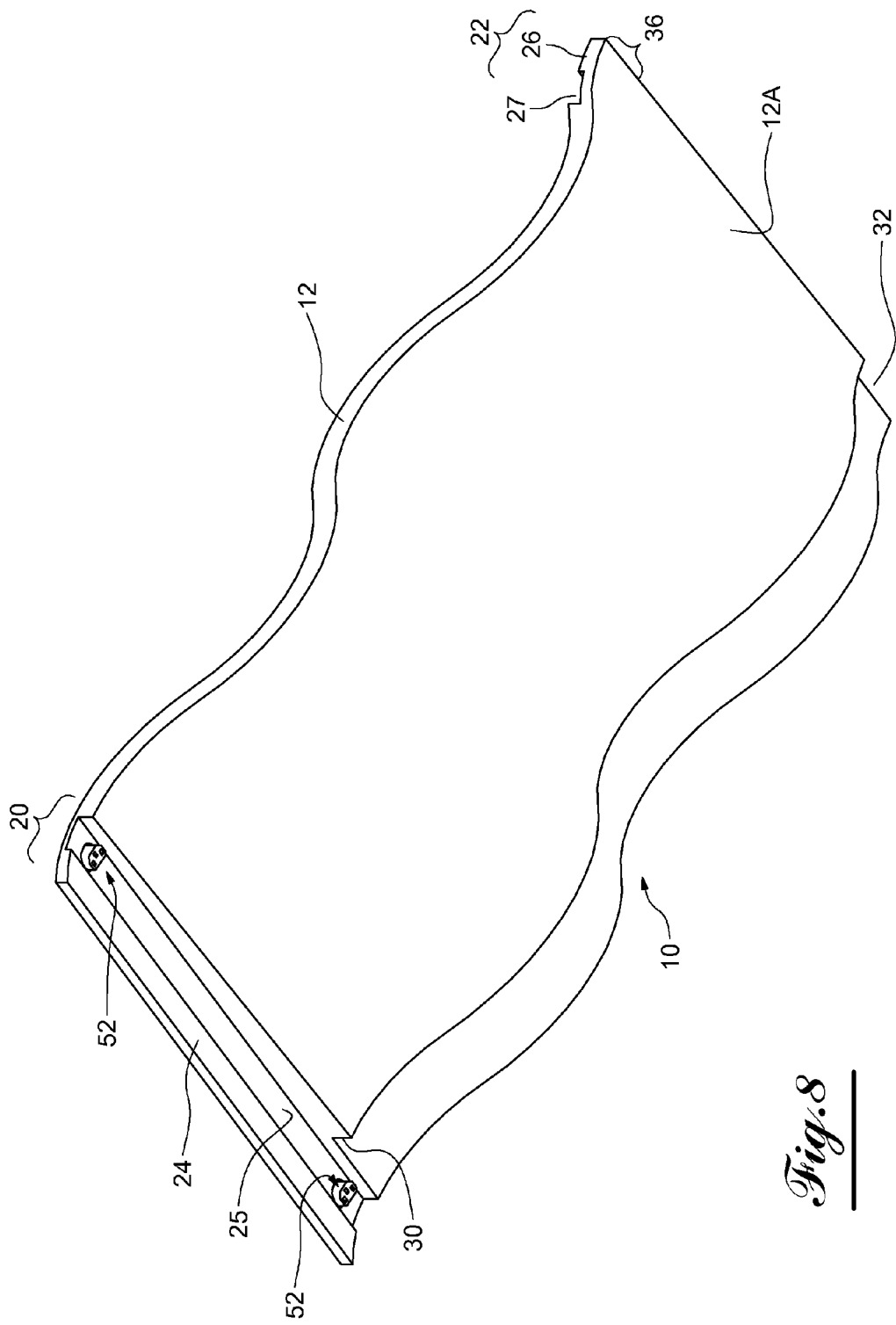
FIG. 8 is a perspective view, of the low angle view type, of the tile shown in FIG. 1.

The tile has, at the lower surface 12A of the body 12, a stop shoulder 30 (FIG. 2) that defines a stop housing 32 (FIG. 8) at a lower edge of the body. The thickness of the body 12 narrows regularly from the shoulder 30 toward the upper end surface 34 of the tile, the height of said surface 34 substantially corresponding to the height of the shoulder 30. The shoulder 30 makes it possible on the one hand to shim the tiles of the lower horizontal row of the roof on a batten of the frame, the batten being housed in the stop housing 32. The shoulder 30 on the other hand makes it possible to shim the tiles of the other horizontal rows while having their stop shoulder 30 bearing on the upper end surface 34 of the tile(s) of the next lowest row. An upper end edge 36 of the lower-row tiles is housed in the stop housing 32 of the higher-row tiles.

The tile 10 has a photovoltaic layer 40 directly in contact with the environment.

The photovoltaic layer 40 overlaps the upper surface 12B of the body 12 except on a border strip that is at least at the bottom edge 22 and the upper end edge 36, these two edges not being lit when the tiles are mounted on the roof. To maximize electrical energy production by maximizing the photovoltaic layer surface, the latter is on a free part of the upper surface of the body that is as large as possible so that it can be exposed to the light when the tile is incorporated into a roof.

In the illustrated embodiment, the photovoltaic layer 40 is a film adhered to the tile using a flexible adhesive making it possible to absorb differential expansions between the body 12 and the film 40. The film is of the type available on the market under brand UNI-SOLAR and manufactured by the company United Solar Ovonic, subsidiary of the company Energy Conversion Devices (ECD). The film may also be of the type available from the company NANOSOLAR, California or the company Ascent Solar, Colorado. Here, the photovoltaic film can withstand outdoor usage conditions, for example by incorporating a transparent protective layer.

As shown in FIGS. 3 to 6, the film forming the photovoltaic layer 40 is housed in a cavity 12C hollowed into the upper surface 12B of the body and the bottom of which includes air passage grooves 42 and air discharge conduits 44 emerging on the one hand in one of the grooves 42 and on the other hand at the lower surface 12A of the tile. The air passage grooves 42 and the air discharge conduits 44 make it possible to cool the photovoltaic layer 40 through the local circulation of air between the film and the body of the tile.

In one alternative not shown, the cooling cavity hollowed into the body to allow air to pass locally between the body and the photovoltaic film may be formed, replacing the grooves, by micro blades or micro perforations.

Aside from aesthetic aspects, the film housed in its cavity advantageously allows its upper surface not to protrude past the upper surface 12B of the body 12 at the periphery of the tile, for example flush with said surfaces, which makes it possible to avoid deterioration of the film when the tiles are stacked for storage.

The top edge 20 and the bottom edge 22 are provided with electrical connectors 52 that are connected to the photovoltaic layer 40 through horizontal electrical conductors 54 and that make it possible to electrically connect one to another the photovoltaic layers 40 of tiles 10 placed adjacent on a roof.

The electrical connectors 52 are formed in nesting assembly elements so that, by nesting one tile 10 on another tile 10 by nesting, that's to say fitting together, the assembly elements of the body 12, the electrical connectors 52 of the tiles 10 come into electrical contact with one another.

In the embodiment shown in FIGS. 1 to 10, the electrical connectors 52 are part of the assembly elements made up on the one hand of a lug 57 forming a plug protruding into the lateral blocking slot 25, and on the other hand, a housing 58 forming a tap arranged withdrawn into the lateral blocking rib 26. The lugs 57 and the housings 58 extend substantially perpendicular to the median plane P at the body 12 of the tile 10, or slightly inclined relative to the plane P, for example by 10 or 20 degrees.

Figure 9:
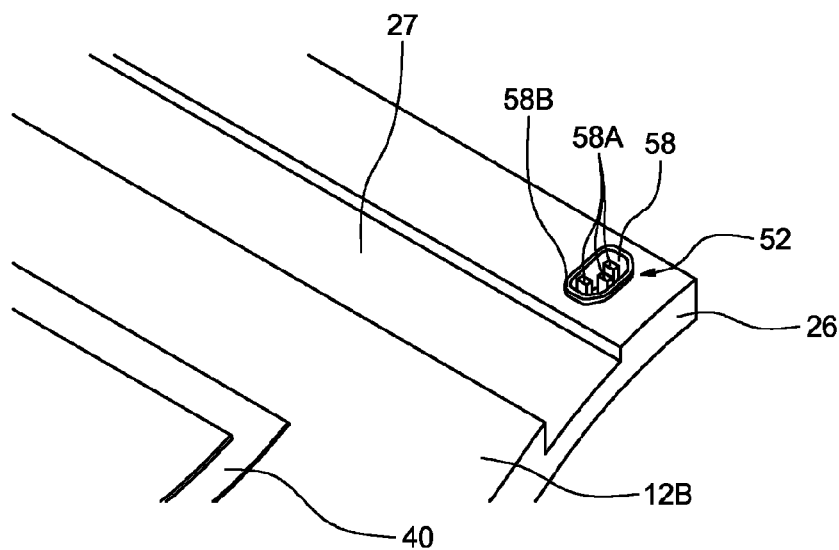
FIG. 9 is a partial perspective view showing the details of an electrical connector of the tile as shown in FIG. 1.
Figure 10:
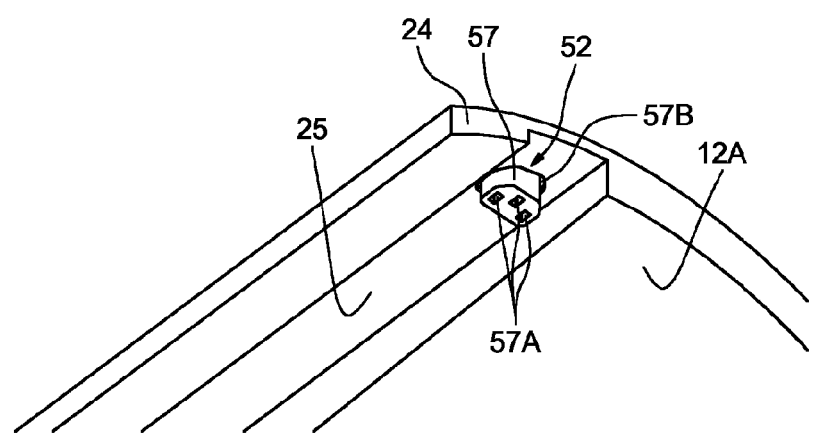
FIG. 10 is a partial perspective view showing the details of an electrical connector of the tile as shown in FIG. 8.

In the embodiment as shown in FIGS. 9 and 10, the lugs 57 and the housings 58 of the electrical connectors 52 are integral with the body 12 while having a hexagonal section having two opposite sides of different lengths, larger than the length of the other sides. The lugs 57 forming plugs and the housings 58 forming taps are of the type resembling the plugs and taps generally used to power CPUs and computer monitors. Three pins 58A forming a male connector, for example made of copper, are in each housing 58, extending parallel to the axes thereof, perpendicular to the median plane P at the body 12 of the tile 10. Three wells 57A made up of female connecting elements shaped into two half-shells, for example made from copper, are formed in the lugs 57. The number of pins is not limited to three and may for example be less than three, a single pin being possible.

The mouth of each housing 58 and the root of each lug 57 respectively include a sealing gutter 57B and a rubber weather strip 58B.

The height of the pins 58A and the wells 57A is adapted to the corrugated profile of the tile and the available thickness in the body, the free end of the lugs 57 and the bottom of the housings 58 being parallel to the plane P of the tile.

The conductors 54 are electrically connected to the pins 58A and the wells 57A, as in computer power supply taps and plugs.

The body is made from a polymer material obtained by molding, for example by injection or compression, incorporating a filler, for example ceramic. The polymer is for example polypropylene (PP) or high density polyethylene (HDPE) or polymethyl methacrylate (PMMA) or polytetrafluoroethylene (PTFE) or any other equivalent material suitable to withstand atmospheric conditions outside the building and strong enough not to break in case of hail, for example.

For other materials, the body can be made from polymer as above, with a wood filler, or an injected or formed wood paste.

In the embodiment illustrated in FIGS. 1 to 8, the electrical conductors 54 and their connection to the pins and wells are embedded in the body 12 made from a molded material, which advantageously serves as electrical insulation.

The dimensions of the tile illustrated in FIG. 1 are approximately 1 m long and 0.5 m wide, with a thickness varying between about 25 mm at the thinnest part of the tile and 50 mm at the shoulder 30, but the invention can apply to smaller tiles, for example smaller by half in terms of length and width, or larger if necessary.

In one embodiment, the upper surface 12B of the body 12 is covered with a protective mineral layer, less than one millimeter thick, for example an ultrafine layer of several microns, and aiming to protect the filled polymer from weather over time so that the latter does not age prematurely, for example due to ultraviolet rays from the sun. The protective mineral layer can be applied during production of the body or afterwards, during finishing. The curing of that optional mineral layer on the tile is done at a temperature compatible with the integrated electrical systems.

Advantageously, the tile 10 is provided with no outer transparent packaging enclosure of the photovoltaic layer 40 and the body 12 because the photovoltaic layer 40 is of a nature to withstand the environment naturally. Both the electrical connectors 42 and the electrical conductors 44 are protected by the body 12 of their tile or adjacent tiles.

The operation and use of the tile 10 already partially emerge from the preceding description and will now be explained in detail.

During placement of the tiles, typically on a frame provided with vertical rafters on which horizontal battens are fixed, a first, lower row of tiles is positioned with the stop shoulder 30 of the tiles against a vertical surface of the lower batten, which is housed in the stop housing 32. These tiles are nailed and screwed on the second batten of the frame, for example by making the nail or screw pass through a piercing formed in the upper end edge 36 of the tiles.

Figure 7:
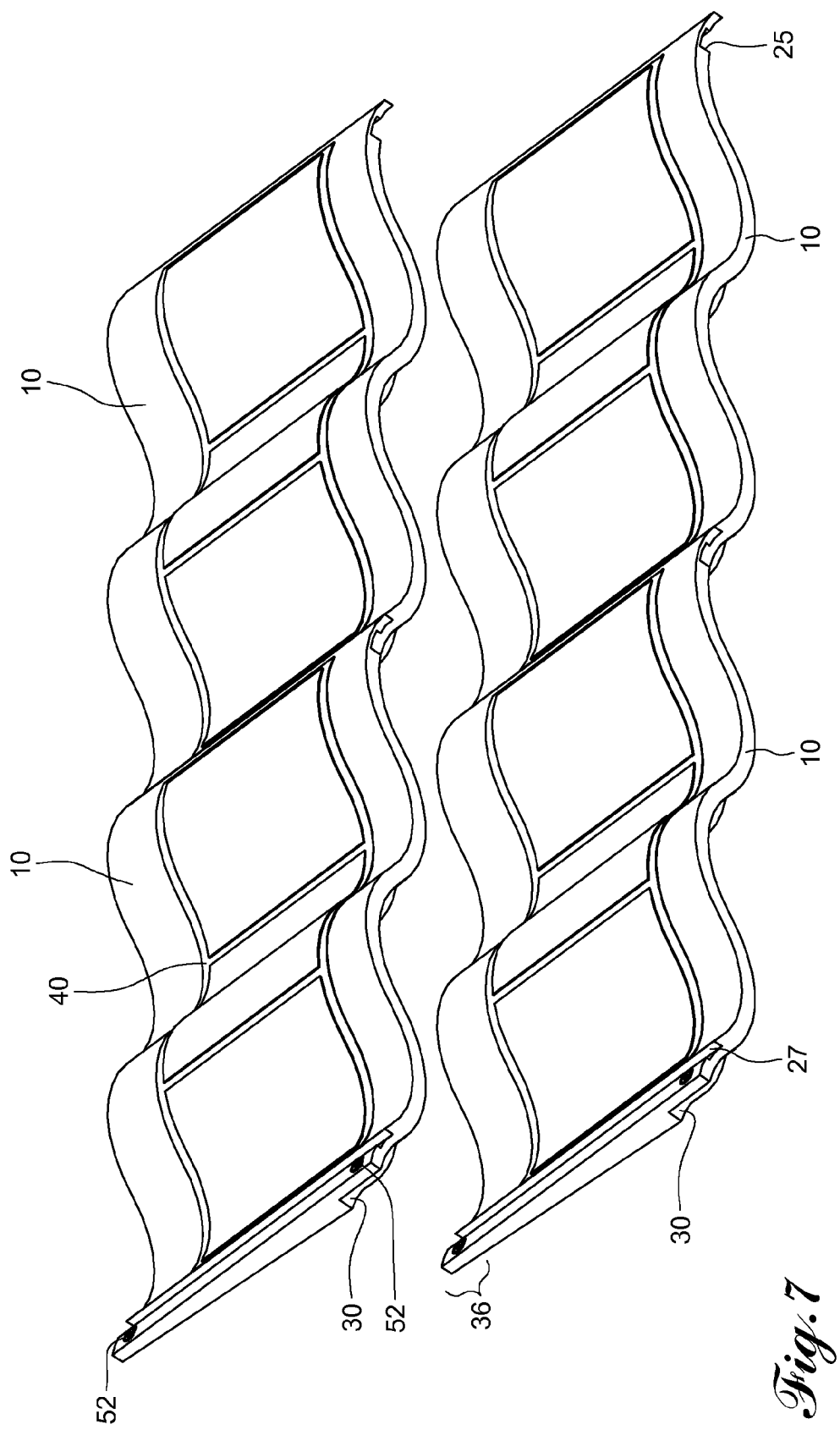
FIG. 7 is a perspective view showing an assembly of a plurality of tiles as shown in FIG. 1.

Next, the upper rows are positioned one by one on the frame by placing, for example after vertical descent of the tiles, the median plane P of each tile 10 substantially parallel to the plane of the battens, then placing each tile in a downward movement in a direction perpendicular to said planes. During said downward movement, the shoulder 30 of the higher-row tile is placed bearing on the upper surface 34 of the upper end edge 36 of the lower-row tile(s) (FIG. 7). During this downward movement, the top edges 20 are placed on the bottom edges 22, with nesting of the lateral blocking ribs 24 or 26 in the corresponding lateral blocking slots 27 or 25 and nesting of the assembly elements to center the tiles relative to one another so that the electrical connectors 52 come correctly into electrical contact with one another. In fact, the centering allows good mutual positioning of the tiles to connect the electrical connectors 52 without deterioration thereof.

In the event the lugs 57 and the housings 58 extend at an incline relative to the plane P of the tile 10, the incline is chosen so that the latter downward movement occurs in a direction closer to the vertical than the perpendicular at the plane P, the incline angle being of the order of magnitude of the slope of the roof, for example slightly smaller than that angle.

Advantageously, the assembly elements and their connector enable an electrical connection at the same time as the mechanical assembly of the tiles, which has the benefit of reducing assembly time for the roof and eliminating delicate manipulations of the tiles. The assembly elements also make it possible to mechanically maintain said tiles relative to one another during placement thereof.

To complete the placement of each tile, one need only nail or screw the tile on its batten, without the need to perform any specific cabling operation of the adjacent photovoltaic tiles. The cabling of the tiles to the electrical network of the building is done upon placement of the tiles by simple connection on a corresponding connector installed on the frame, this connector being of the same type as that of the tiles and being integrated into an electrical circuit of the type illustrated in FIG. 12.

The cabling form shown in FIG. 12 corresponds to electrical connection of adjacent tiles in vertical rows, for convenience called serial connection of the tiles. For this cabling mode, as shown in FIG. 11, the electrical connectors 52 situated at the top of their tile 10 are for example connected to the positive pole of the photovoltaic layer 40, which can include three modules 40A. The electrical connectors 52 situated at the bottom of their tile 10 are connected to the negative pole of the photovoltaic layer 40. A direct alternating converter 63 is connected to each tile row that typically extends from the top to bottom of a roof, the negative pole of the row for example being at the bottom and the positive pole at the top. For example, each converter 63, of the standard type, is used for 16 to 18 tiles of 100 volts and 4 amperes.

Figure 13:
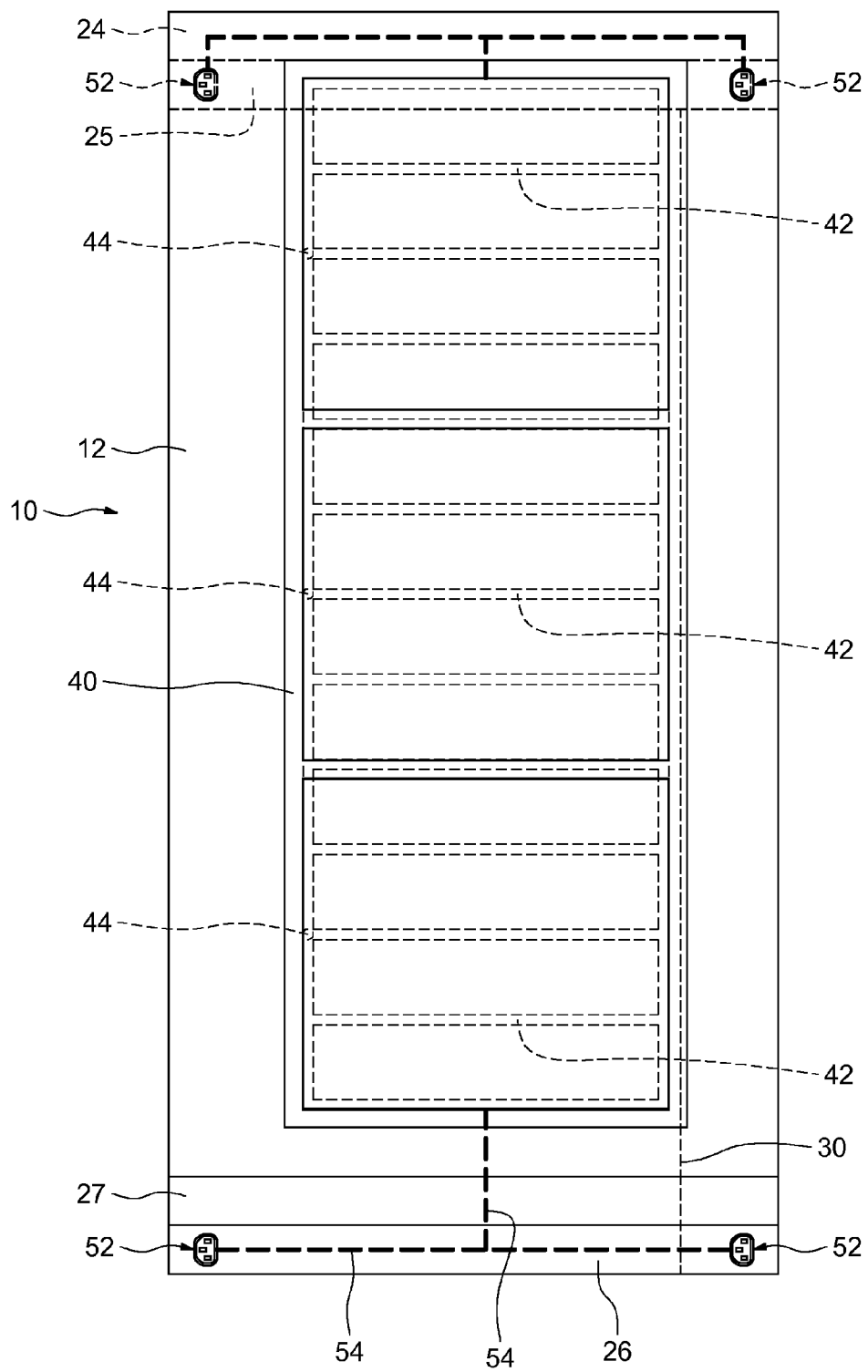
FIG. 13 is a view of the type of FIG. 3 for an alternative embodiment of the internal conductors of the tile according to the invention.

As an alternative of the tile shown in FIG. 13, the electrical conductors are vertical, without any other change for the rest of the tile.

Figure 14:
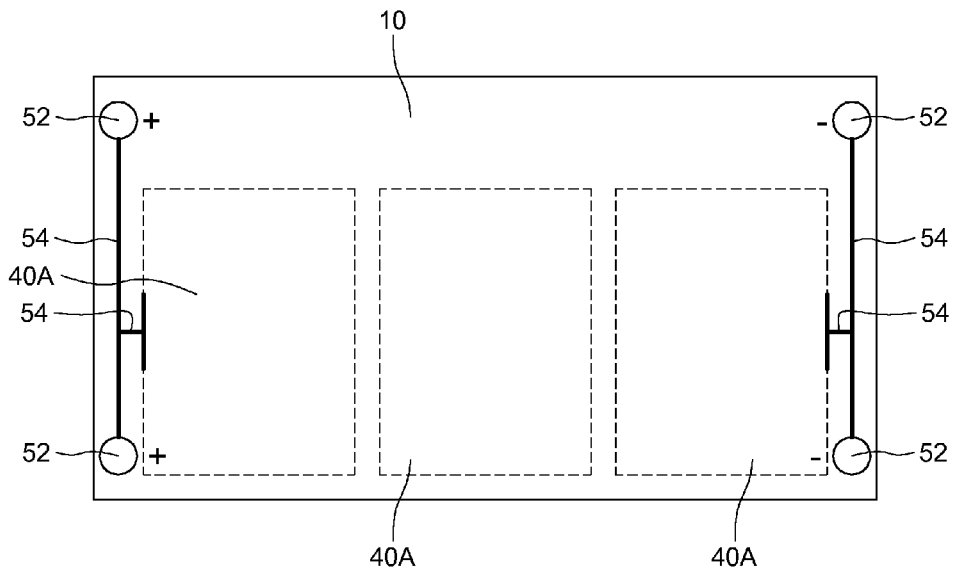
FIGS. 14 and 15 are views showing the polarities and cabling of tiles according to that shown in FIG. 13.
Figure 15:
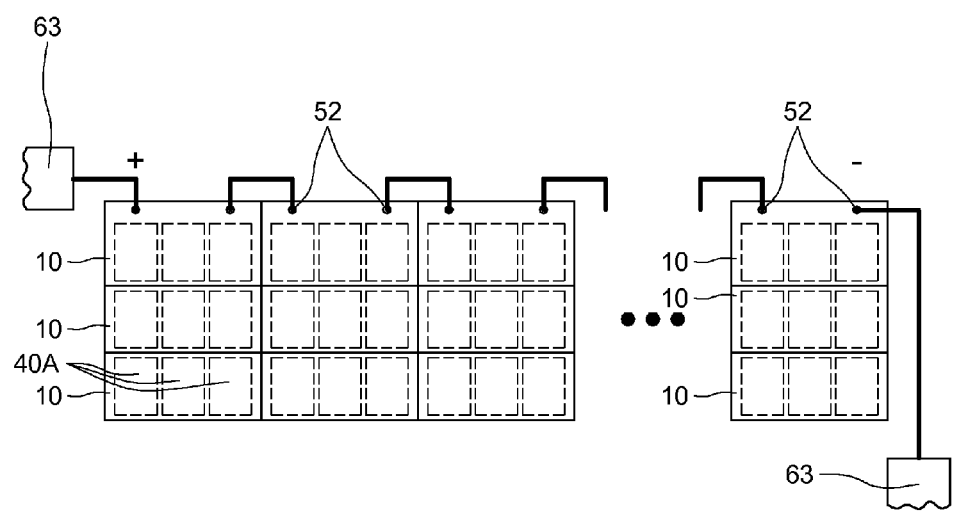

The tiles like those shown in FIG. 13 are connected to one another by cabling as shown in FIG. 15, which corresponds to an electrical connection of adjacent tiles in horizontal rows, for convenience called parallel connection of the tiles. In that case, the electrical connectors 52 situated to the left of their tile 10 are connected for example to the positive pole of the photovoltaic layer 40, which can include three modules 40A, as shown in the figures. The electrical connectors 52 situated to the right of their tile 10 are connected to the negative pole (FIG. 14) of the photovoltaic layer 40. A direct alternating converter is also connected to each row of a group of three tiles, the negative pole of the row for example being to the left of the row and the positive pole to the right.

Figure 16:
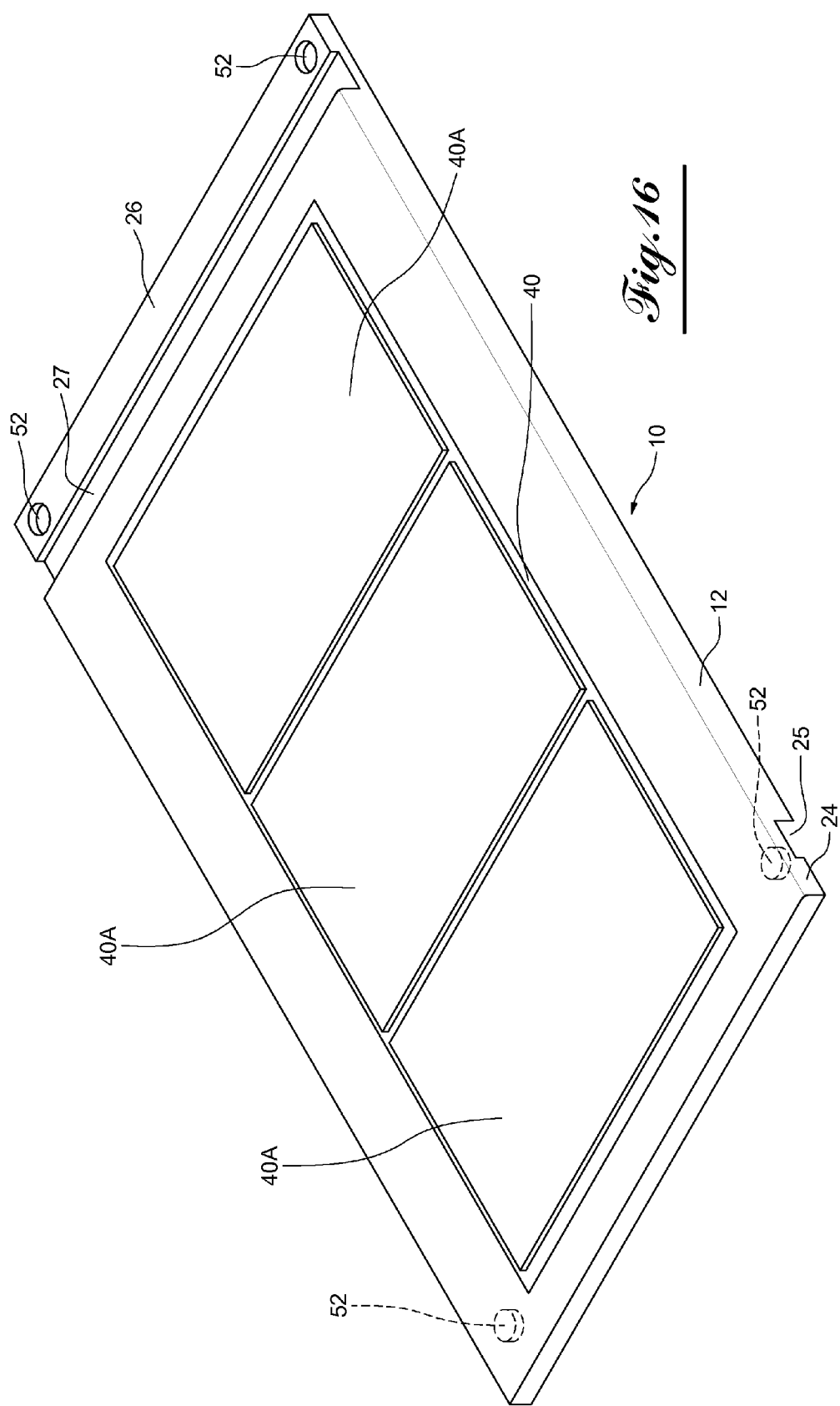
FIG. 16 is a perspective view, of the high angle view type, of a flat alternative embodiment of a tile of the type of that in FIG. 1.

As an alternative of the tile shown in FIG. 16, the body is flat instead of being corrugated, without any other change for the rest of the tile relative to that described with regard to FIGS. 1 to 12. The connectors 52 are the same as those shown for example in FIG. 9 and FIG. 10, but here they are shown diagrammatically.

Figure 17:
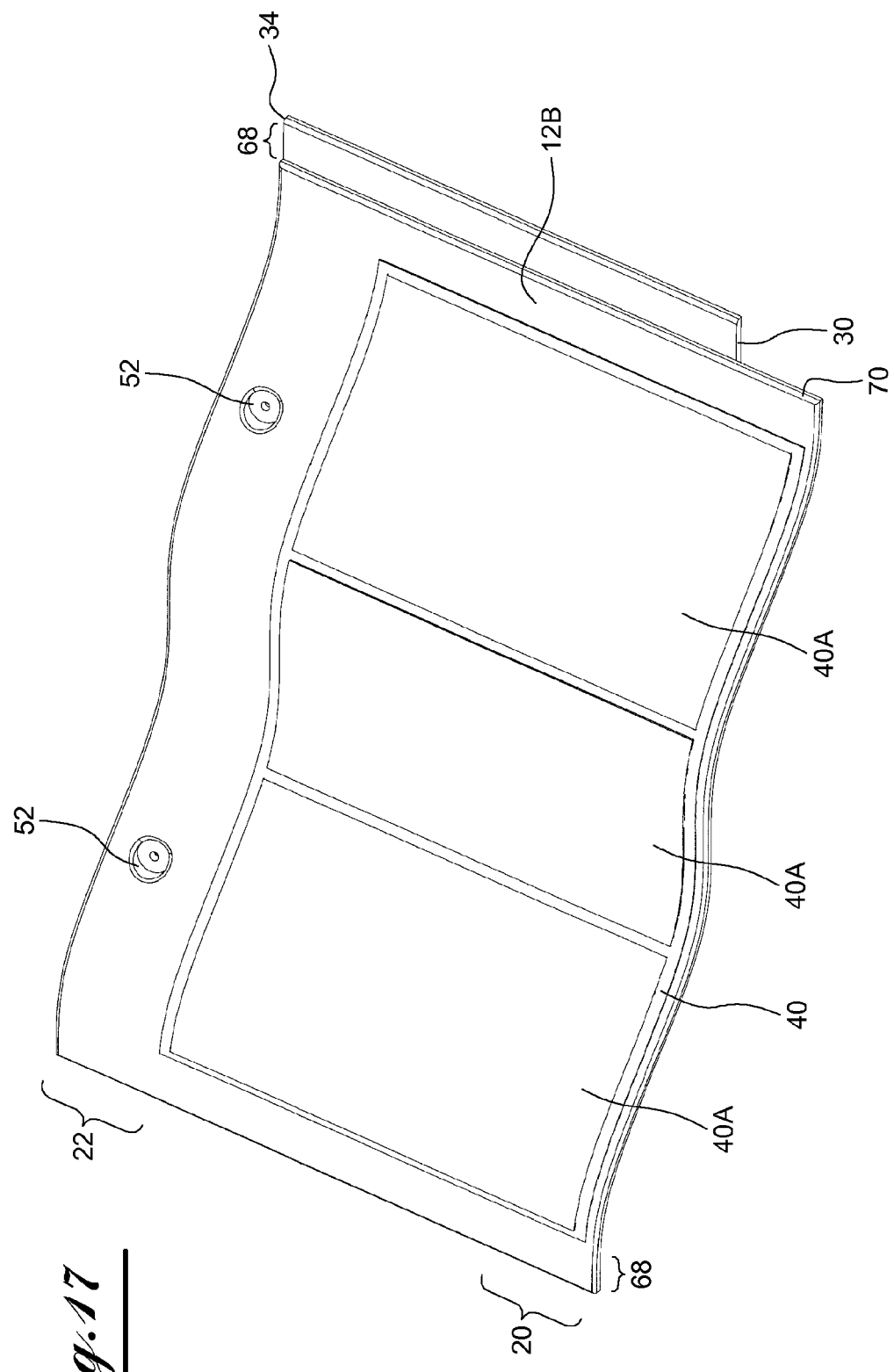
FIG. 17 is a perspective view, of the high angle view type, of a thin alternative embodiment of a tile of the type of that in FIG. 1.

As an alternative of the tile shown in FIG. 17 based on the tile described relative to FIGS. 1 to 12, the body of the tile is thin and has a substantially constant thickness, inasmuch as it does not include the lateral blocking slots and ribs. The latter parts are replaced by a system of flat lateral overlapping edges 68, with a lateral shim shoulders 70 of the type described for vertically shimming the tiles in the embodiment described relative to FIGS. 1 to 12.

Here, the top edge 20 and the bottom edge 22 including the electrical connectors 52 are the lower and upper edges of the tile, respectively. Corresponding lugs and housings, which are shown diagrammatically in FIG. 17, serve to create a mechanical connection between the tiles so as to center them and prevent them from sliding relative to one another, while incorporating the connectors to which the conductors are connected. The connectors are for example as shown in FIGS. 2, 9 and 10 or for example flat plates overlapping the free end of the lugs and the bottom of the housings.

Advantageously, the tiles as described above allow both an aligned assembly of the tiles and a staggered assembly.

In one embodiment not shown, the tile 10 includes a thermally insulating layer on the lower surface 12A of the body 12. The thermally insulating layer is for example fibrous or foam, or made from a foam and fibrous hybrid material, for example such as rock wool or polyurethane, respectively. The thermally insulating layer is covered with the lower finishing layer, for example a polymer plate or film making it possible to protect the thermally insulating layer from impacts during handling of the tile and, if applicable, moisture.

In one embodiment not shown, the photovoltaic layer is a layer of photovoltaic nanoparticles of the type used in inks and films known under the name "Nanosolar" indicated above.

The method for manufacturing such a tile 10 according to the invention will now be explained in detail.

First, the photovoltaic layer 40 in the form of a film, connected to the electrical conductors 54, is pressed on the bottom of a mold cavity and the conductors 54 are positioned in the mold and maintained by guides such as lugs or inserts secured to the cavity and for example secured to electrical connectors 52 present at the free end of the conductors 54.

After closing the mold, which maintains said conductors 54 and connectors 52, the polymer material and its filler are injected into the mold to form the body 12 and bury the conductors 54 therein. The tile is then removed from the mould and is ready to use, without subsequent curing at a temperature above the melting temperature of the integrated connectors and conductors. In fact, the molding must make it possible for the material of the body 12 to be injected at a temperature at which the conductors and the connectors are not deteriorated.

In one alternative method, the material is not injection molded, but form molded using cold or hot compression, without changing the steps described above.

Advantageously, the polymerization of such a polymer material is done directly during molding and/or forming, upon cooling of the material to be stripped from the mould, without curing, as is the case for a traditional terracotta tile. Its material is adapted to polymerization upon cooling after molding or cold forming.

In one alternative method, the photovoltaic layer 40 in the form of a film is not present in the mold during molding, but is connected to the connectors 40 after the removal of the body from the mould, during its adhesion to the body provided with its conductors. Connecting members, for example such as thimbles, are provided at the interface of the conductors and the photovoltaic layer 40.

In one alternative method, if the tile is provided with a protective mineral layer, the latter is for example applied around the photovoltaic layer. Alternatively, the protective mineral layer is applied on the body before adhering the photovoltaic layer on the body of the tile, overlapping the protective mineral layer if necessary.

In alternative methods, when the tile 10 has a thermally insulating layer, the latter is injected by over molding on the body or adhered on the body, the lower finishing layer then if applicable also being fastened by over molding or adhesion.

In one alternative method, nozzles are created in the body during molding, for example by providing drawers in the mold, and the conductors are inserted into the nozzles after the removal of the body from the mould and before connection to the photovoltaic layer. These channels can then be closed or remain open.

FIGS. 18 to 21 show one alternative embodiment of the tile 10 whereof the body 12 includes an upper half-shell 120A and a lower half-shell 120B defining an inner space. The half-shells are nested by their lateral walls, the lateral walls of the upper half-shell 120A overlapping the lateral walls of the lower half-shell 120B.

Figure 18:
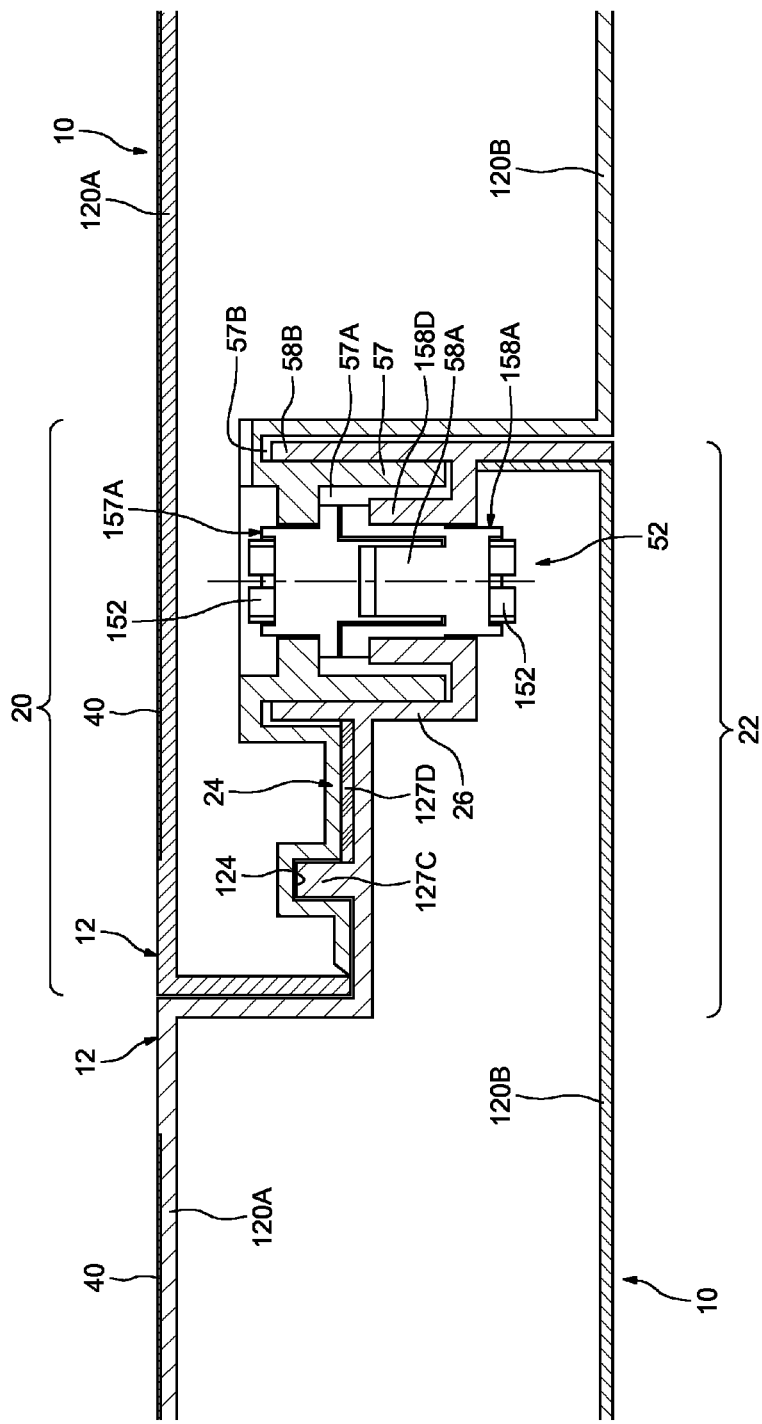
FIG. 18 is a cross-sectional view along a longitudinal plane perpendicular to the photovoltaic surface of a tile according to the invention, showing an alternative embodiment of the body of the tile and its connectors.
Figure 19:
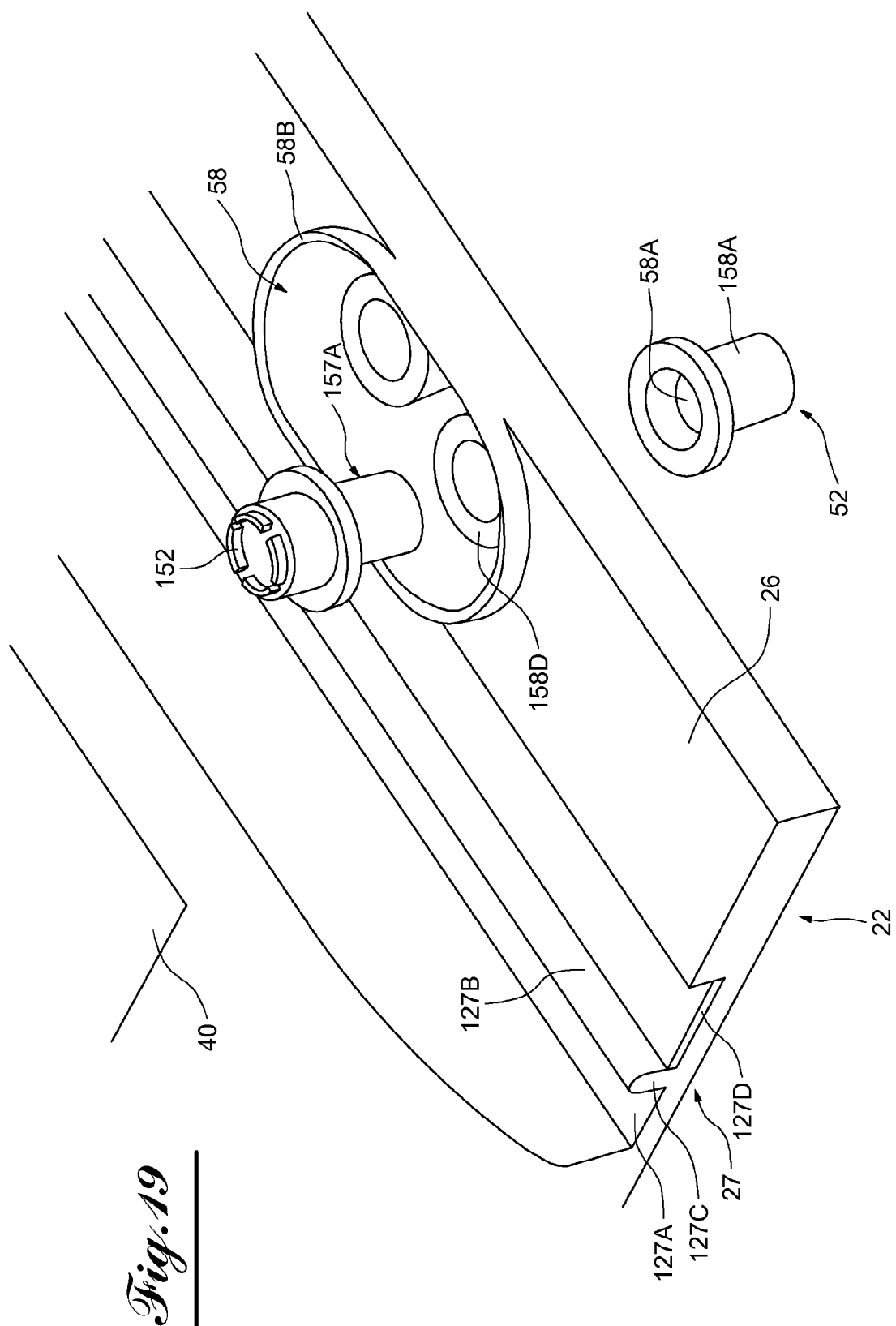
FIG. 19 is a partial perspective view showing the details of an electrical connector of the tile as shown in FIG. 18, in high angle view.

In this embodiment, in FIG. 19 and FIG. 18, taking into consideration the tile 10 shown on the left, one can see that the bottom edge 22 has a lateral blocking slot 27 with two parallel recesses 127A and 127B separated by a rectilinear rib 1270. The recess 127B, closest to the lateral blocking rib 24, receives a flat sealing device 127D.

In this embodiment, each lug 57 and each housing 58 define a volume delimited by the oblong contoured walls and containing two coaxial connectors 52 provided with cylindrical elements.

The rubber weather strip 58B, at the opening of the housing 58, has an oblong contour protruding from the lateral blocking rib 26 of the bottom edge 22. Inside the housing 58, the upper half-shell 120A defines two pillars 158D each receiving a bush 158A inside which a pin 58A of the connector 52 extends. One of the bushes 158A is shown disassembled from its tile in FIG. 19 and, in FIG. 20, ready to be connected.

Each lug 57 here includes a well 57A that contains a connecting bush 157A in which the corresponding pin 58A is housed. Each lug 57, upon mechanical and electrical connection of the adjacent tiles, has the walls thereof defining its well 57A cooperating by engagement with the wall defining the corresponding housing 58. In this way, the weather strip 58B of that wall engages in the corresponding sealing gutter 57B. One of the bushes 157A is shown ready to be connected in FIG. 20. The bushes 157A are shown assembled to their tile, mounted in its lug 57, in FIG. 19.

Each connector 52 includes quarter-circle pads 152 that are connected to the conductors extending between the half-shells 120A and 120B shown.

The top edge 20 includes, aside from its lugs 57, a rectilinear slot 124 formed in its lateral blocking rib 24 to be opposite the rectilinear rib 127C situated between the corresponding parallel recesses 127A and 127B. Part of this lateral blocking rib 24 bears on the flat seal 127D.

In this embodiment, the inner space between the half-shells 120A and 120B is for example filled with polyurethane foam 159, after assembly of the connectors. In this way, the foam for filling the inner space prevents condensation in the body of the tile and participates in the latter's thermal insulation properties.

To manufacture the tile, the method comprises injection or compression molding of the half-shells 120A and 120B, these shells for example having a base of ceramic or wood filled polymer as in the preceding embodiments. Next, the connectors are assembled to their half-shell, for example by crimping or screwing. The conductors are then connected to the connectors and photovoltaic layer. The half-shells 120A and 120B, electrically equipped and not attached, are then placed in a mold for injection of the polyurethane foam, then closing of the tile by bringing said half-shells together. The flat seal 127D is then adhered in its slot.

In the alternative embodiment diagrammatically illustrated in FIG. 21, an inner thermally insulating layer 160 is positioned between the half-shells 120A and 120B. This layer 160 is for example kept parallel to the bottom of the lower half-shell 120B using slugs 162 molded with said half-shell, so as to leave a space between the half-shell and the inner thermally insulating layer space for filling the tile with the polyurethane foam 159.

The thermally insulating layer, allowing the passage of the conductors and/or their maintenance, is for example a vacuum encapsulated insulator, typically of fibers, or a honeycomb. Its material is chosen to have a thermal insulating power several times greater than that of the polyurethane foam.

A junction box 164 is present in the upper half-shell 120A, embedded in an opening thereof. The junction box makes it possible to recover the energy from the photovoltaic layer 40 to connect the latter to the connectors 52 via the conductors 54.

For this alternative, before the injection of the polyurethane foam filler, the thermally insulating layer 160 is placed in the lower half-shell 120B and the junction box 164 is placed in the upper half-shell 120A.

In one alternative not shown of the embodiment diagrammatically illustrated in FIG. 21, a plurality of inner thermally insulating layers are positioned parallel to one another and secured to one another.

In one alternative not shown, a thermally insulating layer inside the body of the tile is provided in a solid tile as shown for example in FIG. 2. In that case, the tile body is molded around the thermally insulating layer, which can serve as a substrate for the electrical conductors and/or the connectors.

In one alternative embodiment diagrammatically illustrated in FIG. 22, an electronic unit 170 is mounted between the inner thermally insulating layer 160 and the bottom of the lower half-shell 120B. This electronic unit 170 is a direct current to alternating current converter, making the tile 10 electrically autonomous for its connection to the other tiles and/or to the electrical circuit of the building.

This electronic unit 170 is in the shape of a relatively flat rectangular rhomb. It is kept parallel to the bottom of the lower half-shell 120B by slugs 172 molded with said half-shell, so as to leave a space between the half-shell and the inner thermally insulating layer for filling the tile with the polyurethane foam 159.

For its electrical function, the unit 170 has, as input, two connectors for connection by conductor to the photovoltaic layer 40 via the junction box 164, and as output, two connectors for the connection via the conductors to the connectors formed in the assembly elements of the tile. The expression "direct current to alternating current converter" also refers to an inverter making it possible to monitor and smooth the electrical energy coming out of the tile.

The invention claimed is:

1. A photovoltaic tile for a roof comprising a plurality of said tiles, at least two adjacent tiles of which at least partially overlap each other, said photovoltaic tile including a body having overlapping edges constituting a top edge and a bottom edge, the top edge being formed so as to cover the bottom edge of at least one of the adjacent tiles, a photovoltaic layer placed on a free part of an upper surface of the body outside the bottom edge, respective male and female electrical connectors which are connected to the photovoltaic layer by electrical conductors in order to electrically connect one to another the photovoltaic layers of at least two adjacent tiles of the roof, respective assembly elements provided on the respective overlapping edges so as to enable said overlapping edges to be mutually positioned during the placement of the two adjacent tiles by nesting of said adjacent assembly elements of the two adjacent tiles, wherein the assembly elements of the tile comprise:

respective blocking assembly elements provided on the respective overlapping edges, said blocking assembly elements comprising at least one shoulder forming a recess in one of the top edge and the bottom edge so as to enable said shoulder to be positioned against the other of the top edge and the bottom edge, respective centering assembly elements provided on the respective blocking assembly elements, said centering assembly elements comprising (i) at least one lug that protrudes from one of the top edge and the bottom edge, and (ii) at least one housing recessed in the other of the top edge and the bottom edge, so as to enable adjacent tiles to be centered relative to one another during the placement of two adjacent tiles by nesting of adjacent assembly elements of the two adjacent tiles, wherein each of the male and female electrical connectors is provided in a respective entirely recessed position in a respective one of the lug and the housing of the tile, so that, through the nesting of the adjacent assembly elements of the two adjacent tiles, the electrical connectors contained in the adjacent assembly elements of the two adjacent tiles simultaneously come into electrical contact with each other.

2. The tile according to claim 1, wherein the conductors are embedded inside the molded body of the tile in their travel between the photovoltaic layer and their electrical connector.

3. The tile according to claim 1, wherein the lug forms a plug protruding from its overlapping edge and the housing forms a tap formed recessed from its overlapping edge, and the male and female electrical connectors in the assembly elements assemble by fitting.

4. The tile according to claim 3, wherein the lug and the housing are substantially perpendicular to the median plane of the tile, that plane being provided to be parallel to the plane of a roof surface receiving the tile.

5. The tile according to claim 1, wherein the photovoltaic layer is in direct contact with the environment.

6. The tile according to claim 1, wherein the photovoltaic layer is a film adhered to the body of the tile using a flexible adhesive making it possible to absorb the differential expansions between the body and the film.

7. The tile according to claim 6, wherein the film making up the photovoltaic layer is housed in a cavity recessed from the upper surface of the body at the free part thereof, the depth of the cavity being such that the upper surface of the film is flush with a peripheral part of the free edge of the upper surface of the body.

8. The tile according to claim 6, wherein the area of the upper surface of the body covered by the photovoltaic film is at least partially hollowed with cooling channels allowing a local passage of air between the body and the photovoltaic film.

9. The tile according to claim 8, wherein the cooling channels are grooves and the body defines air discharge conduits emerging on the one hand in one of the grooves and on the other hand at the lower surface of the tile.

10. The tile according to claim 1, wherein the photovoltaic layer is a layer of photovoltaic nanoparticles.

11. The tile according to claim 1, wherein the body of the tile is made from a polymer-based material.

12. The tile according to claim 11, characterized in that the polymer-based material comprises a ceramic filler.

13. The tile according to claim 1, wherein the body of the tile is made from a wood-based material.

14. The tile according to claim 1, wherein the body has a base of a material adapted to polymerize upon cooling after molding or during press forming.

15. The tile according to claim 11, wherein the upper surface of the body of the tile is covered with a protective mineral layer, in particular protecting it from ultraviolet rays.

16. The tile according to claim 1, wherein the tile includes a thermally insulating layer on the lower surface of the body.

17. The tile according to claim 16, wherein the thermally insulating layer is covered with a lower finishing layer.

18. The tile according to claim 1, wherein the body includes an upper half-shell and a lower half-shell defining an inner space.

19. The tile according to claim 18, wherein the inner space between the upper half-shell and the lower half-shell is filled with a foam.

20. The tile according to claim 1, wherein the body thereof contains at least one inner thermally insulating layer.

21. The tile according to claim 1, wherein the body contains an electronic unit for converting direct current into alternating current.

22. A method for manufacturing a photovoltaic tile according to claim 2, the method including:

positioning conductors in a mold, wherein at least one end of the conductors is provided with an electrical connector, and molding the body of the tile in the mold containing the conductors.

23. The method according to claim 22, including positioning a photovoltaic layer in the mold before molding the body.

24. The method according to claim 22, including positioning a photovoltaic layer on the upper surface of the body after the molding and after removing the body from the mold.

25. A method for covering a frame with photovoltaic tiles according to claim 1, the method including:

after placing at least a first of said tiles on a frame face, bringing a second tile closer so as to position its top edge opposite the bottom edge of the first tile, and placing the second tile adjacent to the first tile by bringing it substantially perpendicular to the plane of said frame face with (i) the top edge of the second tile overlapping the bottom edge of the first tile, and (ii) nesting of the assembly elements substantially perpendicular to said frame face by nesting to mechanically maintain said tiles and connect them electrically.

26. A covering assembly for a roof, comprising a plurality of photovoltaic tiles according to claim 1, the top edge of one of the tiles overlapping the bottom edge of at least one of the adjacent tiles while having their electrical connectors electrically connected.

27. A tile according to claim 1, wherein the blocking assembly elements of the tile comprise (i) a lateral blocking rib that protrudes from one of the top edge and the bottom edge, and (ii) a lateral blocking slot recessed in the other of the top edge and the bottom edge.

28. A tile according to claim 27, wherein the male connectors are recessed in the housing and the female connectors are recessed in the lug.

29. The tile according to claim 27, wherein the lug forms a plug protruding from its overlapping edge and the housing forms a tap formed withdrawn from its overlapping edge, and the male and female connection elements in the assembly elements assemble by fitting.

30. A tile according to claim 1, wherein the lug is located in the recess.

\* \* \* \* \*